(12) United States Patent
Bommer et al.

(10) Patent No.: US 9,084,292 B2
(45) Date of Patent: Jul. 14, 2015

(54) COMMUNICATIONS SYSTEM FOR AN AIRCRAFT

(75) Inventors: Otto Bommer, Offenbach (DE); Udo Findeisen, Sinzheim (DE)

(73) Assignee: Becker Avionics GmbH, Rheinmuenster (DE)

( * ) Notice: Subject to any disclaimer, the term of this patent is extended or adjusted under 35 U.S.C. 154(b) by 280 days.

(21) Appl. No.: 13/695,849

(22) PCT Filed: Apr. 27, 2011

(86) PCT No.: PCT/EP2011/056620
§ 371 (c)(1),
(2), (4) Date: Dec. 26, 2012

(87) PCT Pub. No.: WO2011/138198
PCT Pub. Date: Nov. 10, 2011

(65) Prior Publication Data
US 2013/0095763 A1    Apr. 18, 2013

(30) Foreign Application Priority Data

May 4, 2010   (DE) .................... 10 2010 019 394

(51) Int. Cl.
*H04W 4/00*       (2009.01)
*H04B 1/38*       (2006.01)
*H04W 92/18*      (2009.01)
*H04B 7/185*      (2006.01)
*G08G 5/00*       (2006.01)

(52) U.S. Cl.
CPC ........... *H04W 92/18* (2013.01); *H04B 7/18506* (2013.01); *G08G 5/0004* (2013.01); *G08G 5/0017* (2013.01); *G08G 5/0021* (2013.01)

(58) Field of Classification Search
CPC ............. H04B 7/18506; G08G 5/0004; G08G 5/0017; G08G 5/0021
USPC ....................... 455/426.1, 431, 557, 90.2, 90.3
See application file for complete search history.

(56) References Cited

U.S. PATENT DOCUMENTS 4,903,298 A    2/1990  Cline
5,390,356 A *  2/1995  Houlberg ........................ 703/23
(Continued)

FOREIGN PATENT DOCUMENTS

EP      1 912 336        4/2008
WO      9529552 A1      11/1995

OTHER PUBLICATIONS

International Search Report of PCT/EP2011/056620, Aug. 29, 2011.
(Continued)

*Primary Examiner* — Duc M Nguyen
(74) *Attorney, Agent, or Firm* — Collard & Roe, P.C.

(57) ABSTRACT

The invention relates to a communications system (10, 110) for an aircraft comprising a transceiver (22) having at least one transmitter (24), at least one receiver (26, 28) and at least one antenna, at least one data processing device (12) connected to the transceiver (22) by means of a data transfer device (20) and having at least one operating device (14), connected to the at least one data processing device (12), having manually activated switches, buttons and/or rotary knobs (18) for entering data into the at least one data processing device (12). According to the invention, the at least one operating device (14) is mechanically connected to the at least one data processing device (12) to form an assembly (16).

12 Claims, 3 Drawing Sheets

(56) References Cited

U.S. PATENT DOCUMENTS

Figure 1:
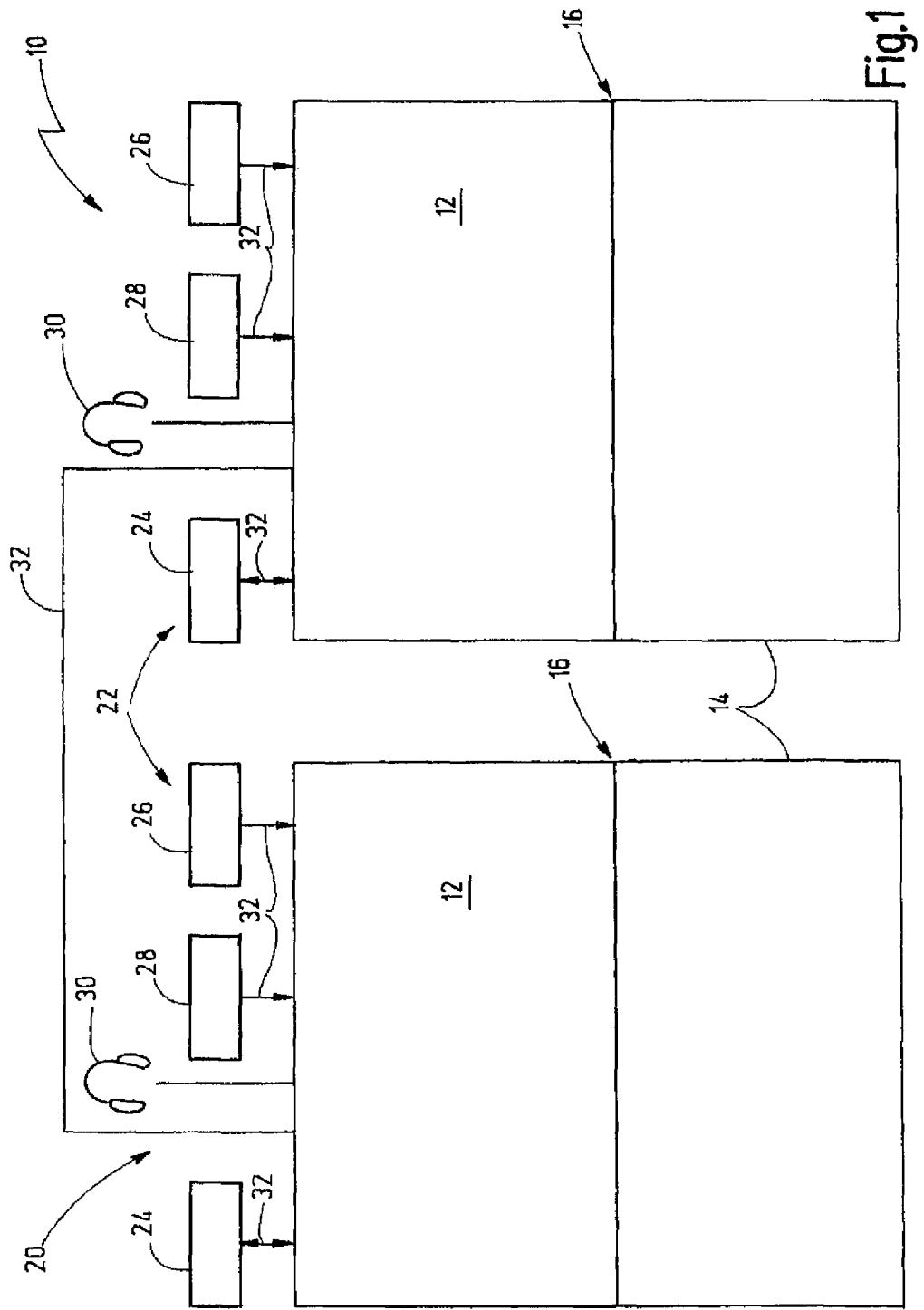

| | | | |
|---|---|---|---|
| 5,903,227 A * | 5/1999 | Scheuer | 340/945 |
| 6,836,659 B2 * | 12/2004 | Gouillou | 455/431 |
| 6,950,627 B2 * | 9/2005 | Vicari | 455/41.2 |
| 6,963,743 B1 * | 11/2005 | James | 455/431 |
| 7,245,909 B2 * | 7/2007 | Goldberg et al. | 455/431 |
| 7,787,913 B2 * | 8/2010 | Cornell | 455/575.2 |
| 2002/0082008 A1 | 6/2002 | Nelson | |
| 2003/0054817 A1 | 3/2003 | Goldberg et al. | |
| 2007/0027589 A1 * | 2/2007 | Brinkley et al. | 701/3 |
| 2007/0130599 A1 * | 6/2007 | Monroe | 725/105 |
| 2008/0084861 A1 * | 4/2008 | Hunter | 370/343 |
| 2008/0133705 A1 | 6/2008 | Lemond et al. | |
| 2008/0248772 A1 | 10/2008 | Vlad et al. | |
| 2009/0077265 A1 * | 3/2009 | Brinkley et al. | 709/249 |
| 2009/0081947 A1 | 3/2009 | Margis | |

OTHER PUBLICATIONS

International Preliminary Report on Patentability of PCT/EP2011/056620, Dec. 3, 2012.

German Search Report dated Sep. 29, 2010 in German Application No. 102010019394.1 with English translation of relevant parts.

* cited by examiner

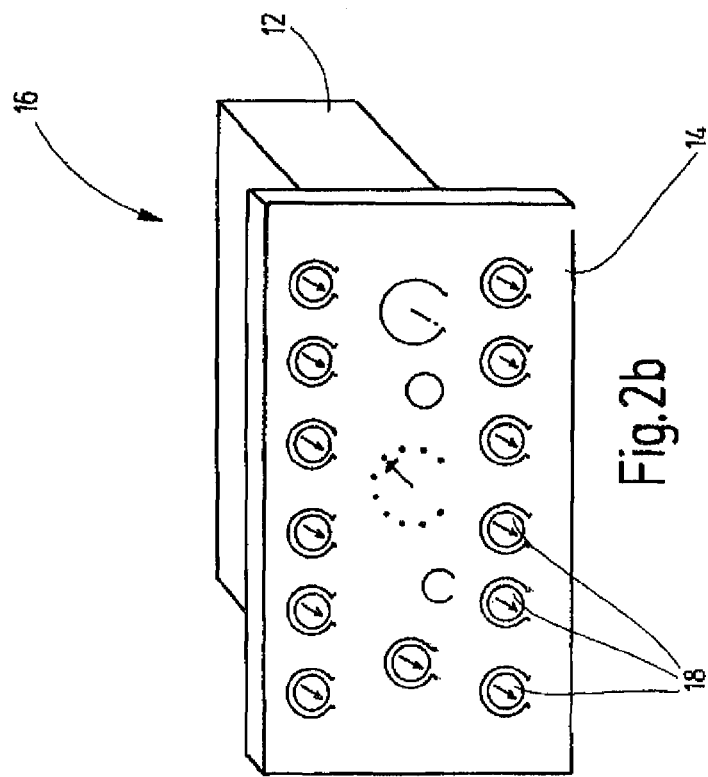
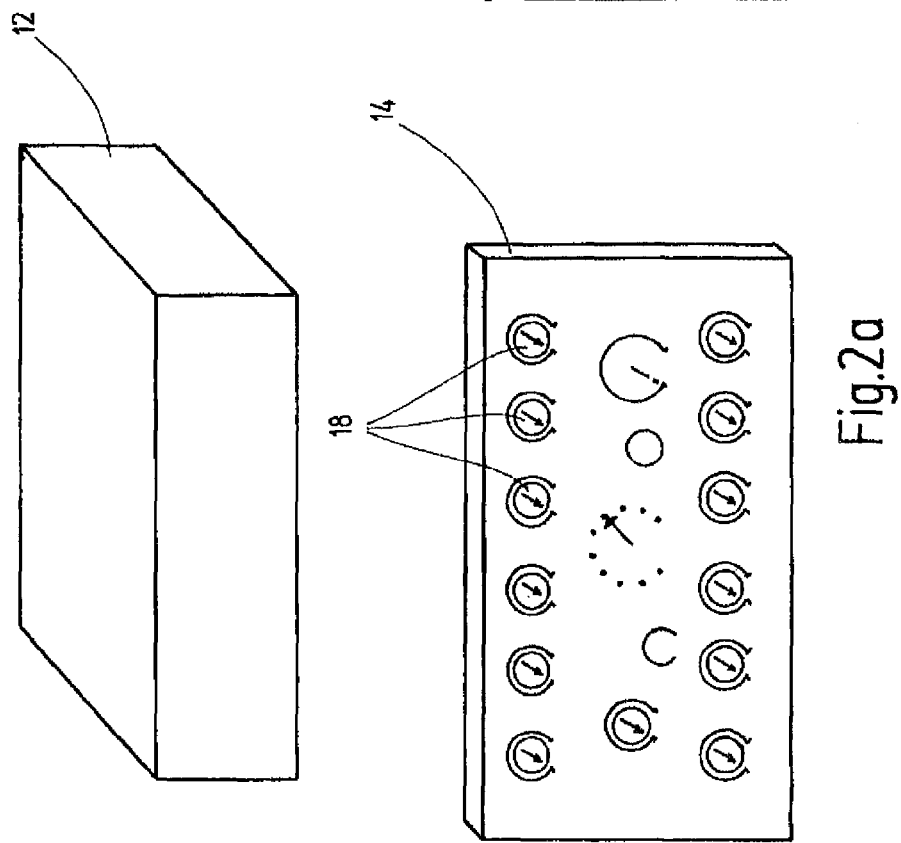

COMMUNICATIONS SYSTEM FOR AN AIRCRAFT

CROSS REFERENCE TO RELATED APPLICATIONS

This application is the National Stage of PCT/EP2011/056620 filed on Apr. 27, 2011, which claims priority under 35 U.S.C. §119 of German Application No. 10 2010 019 394.1 filed on May 4, 2010, the disclosure of which is incorporated by reference. The international application under PCT article 21(2) was not published in English.

The invention relates to a communications system for an aircraft.

Such communications systems allow communication of passengers of an airplane or helicopter with a ground station or another aircraft, on the one hand, and communication of multiple passengers of an aircraft with one another, on the other hand. In this connection, an operating device (panel) is assigned to each of the passengers of the aircraft who are participating in the communication, which device has switches, buttons, knobs and/or other operating elements that can be activated by the operator sitting in front of the panel in the aircraft. In the case of known communications systems, the panels are connected with a central data processing device ([in English:] Remote Unit), which is disposed at a distance from the panel in the aircraft. The remote unit is connected, by means of data lines, with communications devices such as transmission and reception devices of the aircraft, which transmit communications data to ground stations or other aircraft by way of one or more antennas, or receive data from them. The remote unit is connected with the panels by way of data lines, so that data received by way of a reception device, for example, are evaluated in the remote unit and passed on to the panels, where they can be called up by the passengers of the aircraft. Furthermore, data can be transmitted by the passengers, by way of the panels, to the remote unit and from it to a transmission device. Finally, the passengers of the aircraft can communicate with one another, in that they transmit audio data, for example, to the remote unit by way of the panels, which data are then transmitted to the other panels by the remote unit. Thus, data are sent to and by the remote unit, by way of interfaces between the panels and the remote unit.

Such a communications architecture in an aircraft requires a powerful remote unit, which is therefore expensive. The remote unit must be powerful primarily because it must be designed not only for use with only one panel but also for use with a plurality of panels, in order to be able to use it for different aircraft. If a special remote unit were developed for every aircraft type, this would make the costs even higher. Currently, it is usual to design the remote unit in such a manner that it can be used with up to six panels. This means that an aircraft that has seven or eight panels must already be equipped with two remote units or a more expensive special variant.

It is therefore the task of the invention to further develop a communications system for an aircraft, of the type stated initially, in such a manner that it is more cost-advantageous.

This task is accomplished, according to the invention, by means of a communications system having the characteristics described herein. Advantageous further developments of the invention are also described herein.

The invention is based on the idea that every operating device or every panel has its own data processing device directly assigned to it. This is achieved in that the data processing device and the operating device are disposed in the immediate vicinity of one another and mechanically connected with one another to form a modular unit. For maintenance and repair purposes, it is advantageous if the data processing device and the operating device are releasably connected with one another, so that they can easily be separated for replacement. For this purpose, it is practical if the electrical components of the operating device are connected with the electrical components of the data processing device by mean of a plug-in connection. In this way, an electrical connection between the two devices is produced without additional actions by the operator, as soon as these are connected with one another. By means of the standardization of the connection between operating device and data processing device, different demands on the operation of the overall system and in different aircraft can be met.

According to a preferred exemplary embodiment, the communications system according to the invention has multiple operating devices and multiple data processing devices, whereby the number of data processing devices is at least as great as the number of operating devices. In this connection, a data processing device that can be operated by means of the operating device is mechanically connected with each operating device, to form a modular unit. Such a communications system is particularly suitable for aircraft in which multiple passengers must communicate with one another or with locations outside the aircraft, such as ground stations or other aircraft. Such a modular unit is then situated at each work station of an operator. If all the modular units are identical, these can be made available as standard equipment for different types of aircraft, so that such a modular unit can be installed at every work station of an operator. In this way, the communications system can be individually adapted to every aircraft, in contrast to conventional systems, in which one remote unit is connected with multiple panels.

It is advantageous if all of the modular units that consist of a data processing device and an operating device have the same construction. If different operating devices or panels are required at different work stations in the aircraft, it is also possible to configure these in such a manner that they can be connected with identical data processing devices, to form a modular unit. The data processing device is then a standard part that can be installed in a plurality of aircraft, at all work stations. In this connection, it is preferred that the plug-in connections that connect the data processing devices with the operating devices are configured with the same construction, as standard plug-in connections.

According to an advantageous further development of the invention, at least one operating device is connected, by way of the data processing device that is connected with it, with a further data processing device that can be operated by it, by means of the data transmission device (data bus). By means of this measure, the operating device can be configured in such a manner that it can have more radio functions, for example, than a data processing device. The functions of the operating device, for which the data transmission device connected with it is not designed, can then be taken on by the further data processing device. It is advantageous if all the data processing devices are connected with one another by means of the data transmission device or the data bus.

The transmission of audio data in a communications system according to the invention, between two data processing devices or between a data processing device and a transmitter or receiver, preferably takes place by way of two separate data lines. In this connection, a signal sequence that characterizes the audio data, which sequence generally contains a superimposition of multiple sine oscillations, is sampled with a sampling rate and split up into at least a first and a second partial signal sequence. The signal values determined during sampling are alternately assigned to the partial signal sequences, which are then transmitted by way of separate data lines. After the transmission, the signal values of the partial signal sequences are combined again to produce their original temporal sequence, and form the output signal. By means of this measure, increased security in communication is created. If a data line fails in a conventional communications system, no signal can be transmitted between the components that are connected by means of the data line. If the signal is split up into two or more partial signals, and if these partial signals are transmitted by way of separate data lines, then the audio signal can still be understood, in most cases, even if a data line is interrupted and the partial signal transmitted on it is lost. In this connection, it is preferred that the sampling rate is at least twice as great as the frequency of the at least one sine oscillation contained in the signal sequence that characterizes the audio data.

Figure 3:
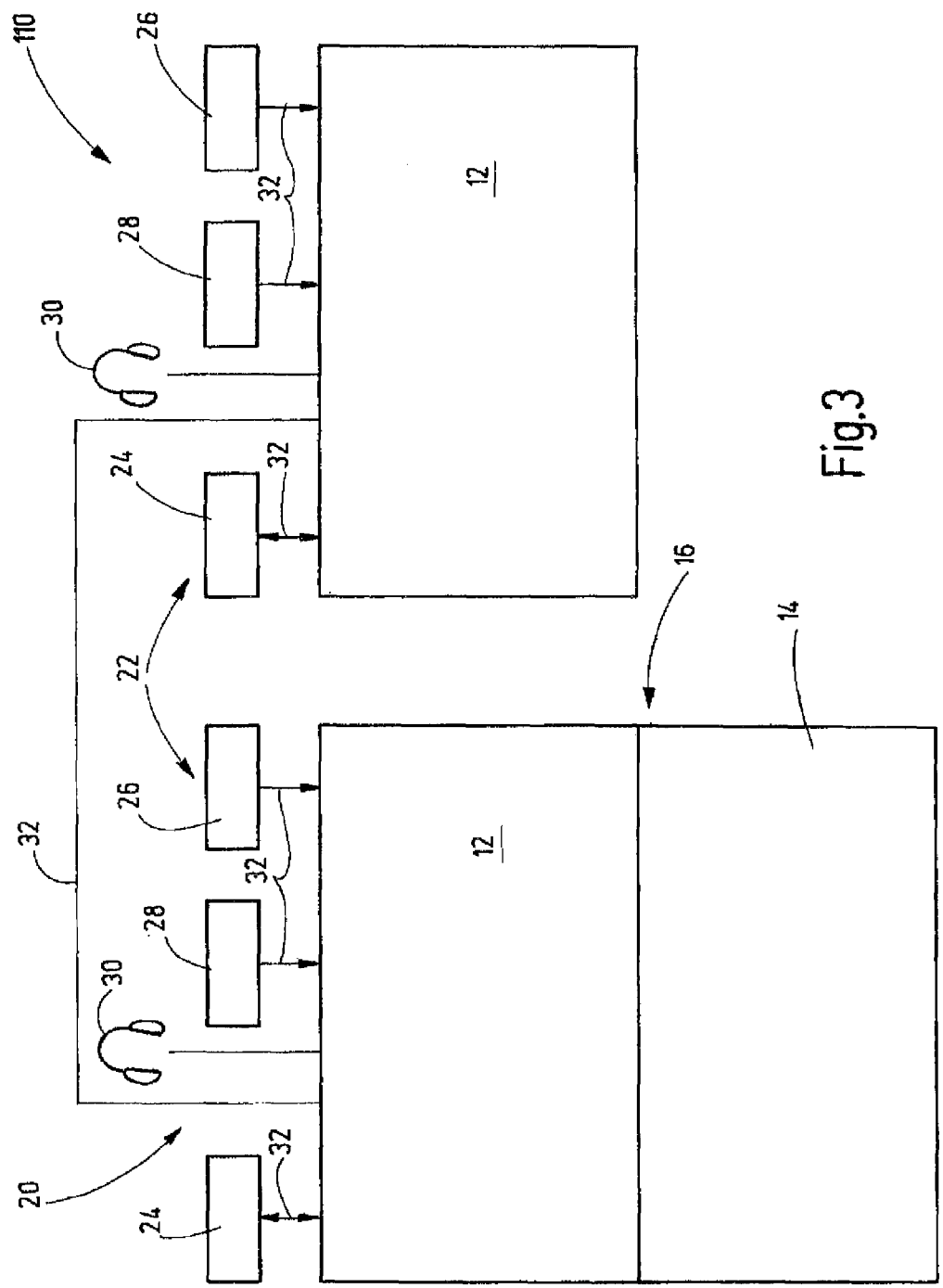

In the following, the invention will be explained in greater detail using the exemplary embodiments shown schematically in the drawing. This shows:

FIG. 1 a communications system in a schematic representation, according to a first exemplary embodiment;

FIGS. 2a, 2b a modular unit consisting of an operating device and a data processing device, in the separated and the assembled state, and FIG. 3 a communications system according to a second exemplary embodiment, in a schematic representation.

The communications system 10 of an aircraft shown in FIG. 1 has a modular unit 16 at two work stations for operators, composed of a data processing device 12 and an operating device 14, in each instance (FIG. 2). Each of the operating devices 14 has a plurality of switches and knobs 18 with which the operator can operate the communications system 10. Each operating device 14 is connected with one of the data processing devices 12, in mechanically firm but releasable manner. A connection between electrical components of the operating device 14 and electrical components of the data processing device 12 takes place by means of standardized plug-in connections.

Each of the data processing devices 12 is connected, by way of a data transmission device 20 that has multiple data lines, with a transmission and reception device 22. In the exemplary embodiment shown here, the latter has three transmission and reception devices (transceivers) 24, three reception devices (receivers), such as, for example, navigation receivers 26, and three so-called fixed reception devices 28, whereby the latter cannot be shut off and serve for reception of warning signals. The transmission and/or reception devices 24, 26, 28 transmit and receive data from and to external reception and transmission devices, by way of at least one antenna. A headset 30 is connected with each of the data processing devices 12, directly or by way of the related operating device 14, with which headset the operator, in each instance, gets audio data transmitted by the data processing device 12, as well as transmits audio data to the data processing device 12 by way of an integrated microphone. The data transmission device 20 furthermore has an audio data bus with which the two data processing devices 12 are connected with one another to exchange audio data. For the sake of the illustration, each data processing device 12 has a transmission and reception device 22 consisting of three transceivers 24, three receivers 26, and three fixed reception devices 28 assigned to it in FIG. 1. In general, however, an aircraft is only equipped with one transmission and reception device 22, the components of which are then connected with each of the data processing devices 12 by way of data lines.

The communications system 110 according to the second exemplary embodiment (FIG. 3) differs from the communications system 10 according to the first exemplary embodiment only in that one of the data processing devices 12 is not connected with an operating device 14. The communications system 110 is therefore intended for an aircraft having only one space for an operator. The same components are therefore provided with the same reference symbols as in the first exemplary embodiment.

The communications system 110 also has a modular unit 16 that is composed of a data processing device 12 and an operating device 14, which are connected with one another in mechanically firm but releasable manner. The modular unit 16 is installed at the work station of the operator in the aircraft. While the operating devices 14 of the first exemplary embodiment were provided for operating three transmission and reception devices 24, reception devices 26, and fixed receivers 28, in each instance, the operating device 14 according to the second exemplary embodiment is provided for operating six transmission and reception devices 24, six reception devices 26, and six fixed receivers 28. The data processing device 12, which is configured identical to the first exemplary embodiment, is not designed for such a number of devices. For this reason, the further data processing device 12 is provided, and the two data processing devices 12 are connected with one another by way of a data line 32 that belongs to the data transmission device 20. The operating device 14 therefore, by way of the two data processing devices 12, one of which is firmly connected with it, operates two transmission and reception devices 22, which consist of nine devices, in each instance. Furthermore, a headset 30 is connected with each data processing device 12, with which headset an operator, in each instance, can listen to received audio data and can transmit audio data to be passed on to the data processing devices 12, by means of a microphone. Therefore, although the communications system 110 has only one place for an operator, an additional place is provided for an aircraft passenger, who at least gets the transmitted audio data and can listen along to the radio traffic, for example.

The data transmission device 20 has two-wire lines 32 as data lines, which are present in duplicate at least where audio data are transmitted. Each audio data set, which is characterized by a signal sequence, is typically sampled at a sampling rate of 22.05 or 44.1 kHz, which is greater than the highest oscillation frequency required for reproduction of the audio data. The signal values determined at the sampling times are alternately transmitted by way of the two parallel two-wire lines 32, and after having been transmitted, are brought together in their original temporal sequence, to produce an output signal. In this way, communication in the aircraft is possible even if one of the two parallel two-wire lines 32 fails, because the partial signal sequence transmitted by way of the intact two-wire line 32 is generally sufficient to understand the audio data.

In the exemplary embodiments shown, the communications system 10, 110 is designed for one or two operators. It is understood that the communications system 10, 110 can be designed for multiple operators, in simple manner, in that a modular unit 16 is made available for each operator.

In summary, the following should be stated:

The invention relates to a communications system 10, 110 for an aircraft, having a transmission and reception device 22 having at least one transmitter 24, at least one receiver 26, 28, and at least one antenna, having at least one data processing device 12 connected with the transmission and reception device 22 by means of a data transmission device 20, and having at least one operating device 14 having manually activated switches, buttons and/or knobs, connected with the at least one data processing device 12, for input of data into the at least one data processing device 12. According to the invention, it is provided that the at least one operating device 14 is mechanically connected with the at least one data processing device 12, to form a modular unit 16.

The invention claimed is:

1. Communications system for an aircraft, having a transmission and reception device having at least one transmitter, at least one receiver, and at least one antenna, having at least one data processing device connected with the transmission and reception device via a data transmission device for transmission of audio data, and having at least one operating device having manually activated switches, buttons and/or knobs, connected with the at least one data processing device, for input of data into the at least one data processing device, wherein the at least one operating device is mechanically and releasably connected with the at least one data processing device, to form a modular unit and wherein electrical components of the at least one operating device are connected with electrical components of the at least one data processing device via an electrical plug-in connection.

2. Communications system according to claim 1, comprising multiple operating devices and multiple data processing devices, wherein the number of data processing devices is at least as great as the number of operating devices, and wherein a data processing device that can be operated via the operating device is mechanically connected with each operating device, to form a modular unit.

3. Communications system according to claim 2, wherein all the data processing devices have the same construction.

4. Communications system according to claim 3, wherein the electrical plug-in connections are configured with the same construction, as standard plug-in connections.

5. Communications system according to claim 2, wherein at least one of the operating devices is connected, by way of the data processing device that is connected with it, with a further data processing device that can be operated by it, via the data transmission device.

6. Communications system according to claim 2, wherein all the data processing devices are connected with one another via the data transmission device.

7. Communications system according to claim 6, wherein audio data can be transmitted between the data processing devices, via the data transmission device.

8. Communications system according to claim 2, wherein at least one of the and preferably each of the data processing devices is connected with at least one transmitter and at least one receiver, via an analog two wire line, in each instance.

9. Method for transmission of audio data between two data processing devices and/or between a data processing device and a transmitter or receiver, in a communications system according to claim 1, wherein a signal sequence that characterizes the audio data is sampled with a sampling rate and split up into at least a first and a second partial signal sequence, wherein the signal values determined during sampling are alternately assigned to the partial signal sequences, wherein the partial signal sequences are transmitted by way of separate data lines, and wherein after the transmission, the signal values of the partial signal sequences are combined again to produce their original temporal sequence, to form an output signal.

10. Method according to claim 9, wherein the signal sequence that characterizes the audio data contains at least one sine oscillation and wherein the sampling rate is at least twice as great as the frequency of the at least one sine oscillation.

11. An aircraft comprising a communications system, the communications system having a transmission and reception device having at least one transmitter, at least one receiver, and at least one antenna, having at least one data processing device connected with the transmission and reception device via a data transmission device for transmission of audio data, and having at least one operating device having manually activated switches, buttons and/or knobs, connected with the at least one data processing device, for input of data into the at least one data processing device, wherein the at least one operating device is mechanically and releasably connected with the at least one data processing device, to form a modular unit and wherein electrical components of the at least one operating device are connected with electrical components of the at least one data processing device via an electrical plug-in connection.

12. The aircraft according to claim 11, further comprising multiple operating devices and multiple data processing devices, wherein the number of data processing devices is at least as great as the number of operating devices, and wherein a data processing device that can be operated via the operating device is mechanically connected with each operating device, to form a modular unit.

* * * * *